(12) United States Patent
Timm et al.

(10) Patent No.: US 10,956,518 B2
(45) Date of Patent: Mar. 23, 2021

(54) SYSTEMS AND METHODS FOR IMPROVED WEB SEARCHING

(71) Applicant: Oath Inc., Dulles, VA (US)

(72) Inventors: Sean Christopher Timm, Herndon, VA (US); Sudhir Achuthan, Vienna, VA (US)

(73) Assignee: Verizon Media Inc., New York, NY (US)

( * ) Notice: Subject to any disclaimer, the term of this patent is extended or adjusted under 35 U.S.C. 154(b) by 508 days.

(21) Appl. No.: 15/237,463

(22) Filed: Aug. 15, 2016

(65) Prior Publication Data

US 2016/0350434 A1 Dec. 1, 2016

Related U.S. Application Data

(63) Continuation of application No. 14/543,752, filed on Nov. 17, 2014, now Pat. No. 9,449,101, which is a
(Continued)

(51) Int. Cl.
*G06F 16/9535* (2019.01)
*G06F 16/16* (2019.01)
(Continued)

(52) U.S. Cl.
CPC ........ *G06F 16/9535* (2019.01); *G06F 16/162* (2019.01); *G06F 16/2228* (2019.01);
(Continued)

(58) Field of Classification Search
USPC ................................ 707/767, 708, 758, 780
See application file for complete search history.

(56) References Cited

U.S. PATENT DOCUMENTS 6,336,117 B1 * 1/2002 Massarani ......... G06F 17/30867
707/711
7,225,182 B2 5/2007 Paine et al.
(Continued)

OTHER PUBLICATIONS

PCT International Search Report and Written Opinion of the International Searching Authority dated Aug. 10, 2010, In corresponding to PCT/US2010/036839, 6 pages.
(Continued)

*Primary Examiner* — Cam Linh T Nguyen
(74) *Attorney, Agent, or Firm* — Bookoff McAndrews, PLLC

(57) ABSTRACT

Systems and methods are provided for improved web searching. In one implementation, suggested search queries are provided based on previous search queries and click data. A weighted bi-partite graph or index may be used to identify related search queries based on overlapping clicked URLs. According to a method, query-click log data of a search engine is processed to generate sets of suggested search queries, data corresponding to each suggested search query, and a set of clicked URLs related to each suggested search query. Additionally, or independently, methods may be provided for contextually correcting spelling errors within sets of suggested search queries using e contextual algorithm, and/or identifying and discarding sets of suggested search queries and URLs that lead to restricted material, such as restricted content and related URLs.

18 Claims, 8 Drawing Sheets

Related U.S. Application Data continuation of application No. 13/794,534, filed on Mar. 11, 2013, now Pat. No. 8,892,592, which is a continuation of application No. 13/465,466, filed on May 7, 2012, now Pat. No. 8,396,885, which is a continuation of application No. 12/791,481, filed on Jun. 1, 2010, now Pat. No. 8,176,069.

(60) Provisional application No. 61/182,991, filed on Jun. 1, 2009.

(51) Int. Cl.
*G06F 16/28* (2019.01)
*G06F 16/951* (2019.01)
*G06F 16/22* (2019.01)
*G06F 16/332* (2019.01)
*G06F 16/9032* (2019.01)
*G06F 16/955* (2019.01)

(52) U.S. Cl.
CPC ........ *G06F 16/285* (2019.01); *G06F 16/3322* (2019.01); *G06F 16/9032* (2019.01); *G06F 16/951* (2019.01); *G06F 16/9566* (2019.01)

(56) References Cited

U.S. PATENT DOCUMENTS

| | | | |
|---|---|---|---|
| 7,254,774 B2 | 8/2007 | Cucerzan et al. | |
| 7,539,632 B1* | 5/2009 | Chakrabarti | G06Q 30/02 705/26.1 |
| 7,769,757 B2 | 8/2010 | Grefenstette et al. | |
| 7,836,133 B2* | 11/2010 | Quinlan | H04L 63/126 709/206 |
| 7,849,507 B1* | 12/2010 | Bloch | H04L 63/0236 726/22 |
| 7,861,258 B2* | 12/2010 | Barton | G11B 27/105 725/28 |
| 7,925,498 B1 | 4/2011 | Baker et al. | |
| 8,005,816 B2 | 8/2011 | Krishnaprasad et al. | |
| 8,037,086 B1 | 10/2011 | Upstill et al. | |
| 8,281,382 B1* | 10/2012 | Sanyal | H04L 47/125 726/9 |
| 8,661,012 B1 | 2/2014 | Baker et al. | |
| 8,965,892 B1* | 2/2015 | Emigh | G06F 16/9535 707/737 |
| 2005/0027717 A1 | 2/2005 | Koudas et al. | |
| 2005/0144279 A1* | 6/2005 | Wexelblat | G06Q 30/06 709/225 |
| 2006/0021009 A1* | 1/2006 | Lunt | H04L 51/12 726/4 |
| 2006/0047649 A1 | 3/2006 | Liang | |
| 2006/0114832 A1* | 6/2006 | Hamilton | H04W 76/20 370/244 |
| 2006/0277167 A1* | 12/2006 | Gross | G06F 16/9577 |
| 2007/0136139 A1* | 6/2007 | Choi | G06Q 20/206 705/18 |
| 2007/0143422 A1* | 6/2007 | Cai | H04M 3/436 709/206 |
| 2007/0168354 A1* | 7/2007 | Ramer | G06Q 20/16 |
| 2007/0250863 A1* | 10/2007 | Ferguson | H04H 20/106 725/46 |
| 2008/0104056 A1 | 5/2008 | Li et al. | |
| 2008/0270549 A1* | 10/2008 | Chellapilla | G06F 17/30864 709/206 |
| 2009/0059935 A1* | 3/2009 | Dec | H04L 12/2874 370/401 |
| 2009/0150370 A1 | 6/2009 | Christensen et al. | |
| 2009/0254572 A1* | 10/2009 | Redlich | G06Q 10/06 |
| 2009/0259646 A1 | 10/2009 | Fujita et al. | |
| 2009/0265328 A1* | 10/2009 | Parekh | G06F 16/951 |
| 2009/0271800 A1 | 10/2009 | Deshpande et al. | |
| 2009/0300768 A1* | 12/2009 | Krishnamurthy | H04L 63/1483 726/26 |
| 2010/0228710 A1 | 9/2010 | Imig et al. | |
| 2010/0290482 A1 | 11/2010 | Martino et al. | |
| 2010/0293185 A1* | 11/2010 | Rosado | G06F 16/958 707/769 |
| 2013/0276120 A1* | 10/2013 | Dalcher | H04L 63/1441 726/24 |
| 2018/0091547 A1* | 3/2018 | St. Pierre | H04L 63/1458 |

OTHER PUBLICATIONS

Chen et al., "CLHQS: Hierarchical Query Suggestion by Mining Clickthrough Log," Advances In Knowledge Discovery and Data Mining: 13$^{th}$ pacific-Asia Conference, Apr. 27, 2009, 8 pages.

Baeza-Yates et al., "Query Recommendation Using Query Logs In Search Engines," Lecture Notes in Computer Science, vol. 3268, Mar. 18, 2004, 7 pages.

Wen et al., "Clustering User Queries of a Search Engine," International World Wide Web Conference, Jan. 1, 2001, 7 pages.

* cited by examiner

SYSTEMS AND METHODS FOR IMPROVED WEB SEARCHING

CROSS-REFERENCE TO RELATED APPLICATIONS

This application is a continuation of and claims the benefit of priority to U.S. application Ser. No. 14/543,752, filed Nov. 17, 2014 (now allowed), which is a continuation of U.S. application Ser. No. 13/794,534, filed Mar. 11, 2013 (now U.S. Pat. No. 8,892,592), which is a continuation of U.S. application Ser. No. 13/465,466, filed May 7, 2012 (now U.S. Pat. No. 8,396,885), which is a continuation of U.S. application Ser. No. 12/791,481, filed Jun. 1, 2010 (now U.S. Pat. No. 8,176,069), which claims the benefit of priority to U.S. Provisional Patent Application No. 61/182,991, filed Jun. 1, 2009. The contents of the above-referenced applications are expressly incorporated herein by reference to their entireties.

BACKGROUND

Technical Field

The present disclosure generally relates to the field of computerized searching of information, including systems and method for providing a search engine. In particular, and without limitation, the present disclosure relates to systems and methods for providing suggested search queries for a received search query based on stored search queries and URL data, categorizing search queries and URLs, and to providing contextual spelling correction.

Background Information

Efficient retrieval of information (e.g., web pages and/or other online content) using a search engine requires a search query that specifically and accurately reflects desired information. Such an initial search query, if reasonably accurate, helps reduce the number of refinements to the search query necessary for the search engine to provide the desired results to the user.

However, for various reasons, the user may provide an initial search query that is short and vague, and as such, may not accurately represent the desired information. For example, the user's understanding of the desired information may be limited, causing the user to specify a search query that is not representative of the desired information. Additionally, or alternatively, the user may not realize that an initial query is insufficiently specific to return the desired information. As such, users must often generate several iterations of refined or reformulated search queries before the search engine returns the desired information.

Search engines can maintain "query-click logs" that record each query provided to the search engine and a uniform resource locator (URL) associated with the resulting link, or links, that a user clicks in response to the provided search query. However, relationships between queries and clicked URLs records within these "query-click logs" are rarely used for generating suggested search queries.

In view of the foregoing, there is a need for improved systems and methods for providing suggested search queries to a user based on, for example, previous search queries and corresponding URL click data. Such systems and methods may be implemented in computer-based environments, such as the Internet and network environments that provide online search engines.

SUMMARY

Consistent with disclosed embodiments, a computer-implemented method for providing suggested search queries is provided. The method receives an initial search query that includes one or more of a keyword or a portion of a URL. The initial search query is processed to conform with one or more requirements of a search engine. The method compares the processed search query against an index of suggested search queries. The index includes stored search queries and related click data based on previous search queries. The method identifies, on the basis of the comparison, one or more suggested search queries related to the initial search query.

Consistent with additional disclosed embodiments, an apparatus having a storage device and a processor is provided. The storage device stores a program for controlling the processor, and the processor, being operative with the program, is configured to receive an initial search query that includes one or more of a keyword or a portion of a URL. The processor is further configured to process the initial search query to conform with one or more requirements of a search engine. The processor is configured to compare the processed search query against an index of suggested search queries. The index includes stored search queries and related click data based on previous search queries. The processor is configured to identify, on the basis of the comparison, one or more suggested search queries related to the initial search query.

Other disclosed embodiments relate to a computer-readable medium with stored instructions that, when executed by a processor, perform a method for providing suggested search queries is provided. The method receives an initial search query that includes one or more of a keyword or a portion of a URL. The initial search query is processed to conform with one or more requirements of a search engine. The method compares the processed search query against an index of suggested search queries. The index induces stored search queries and related click data based on previous search queries. The method identifies, on the basis of the comparison, one or more suggested search queries related to the initial search query.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

DESCRIPTION OF THE EMBODIMENTS

Reference will now be made in detail to embodiments of the invention, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
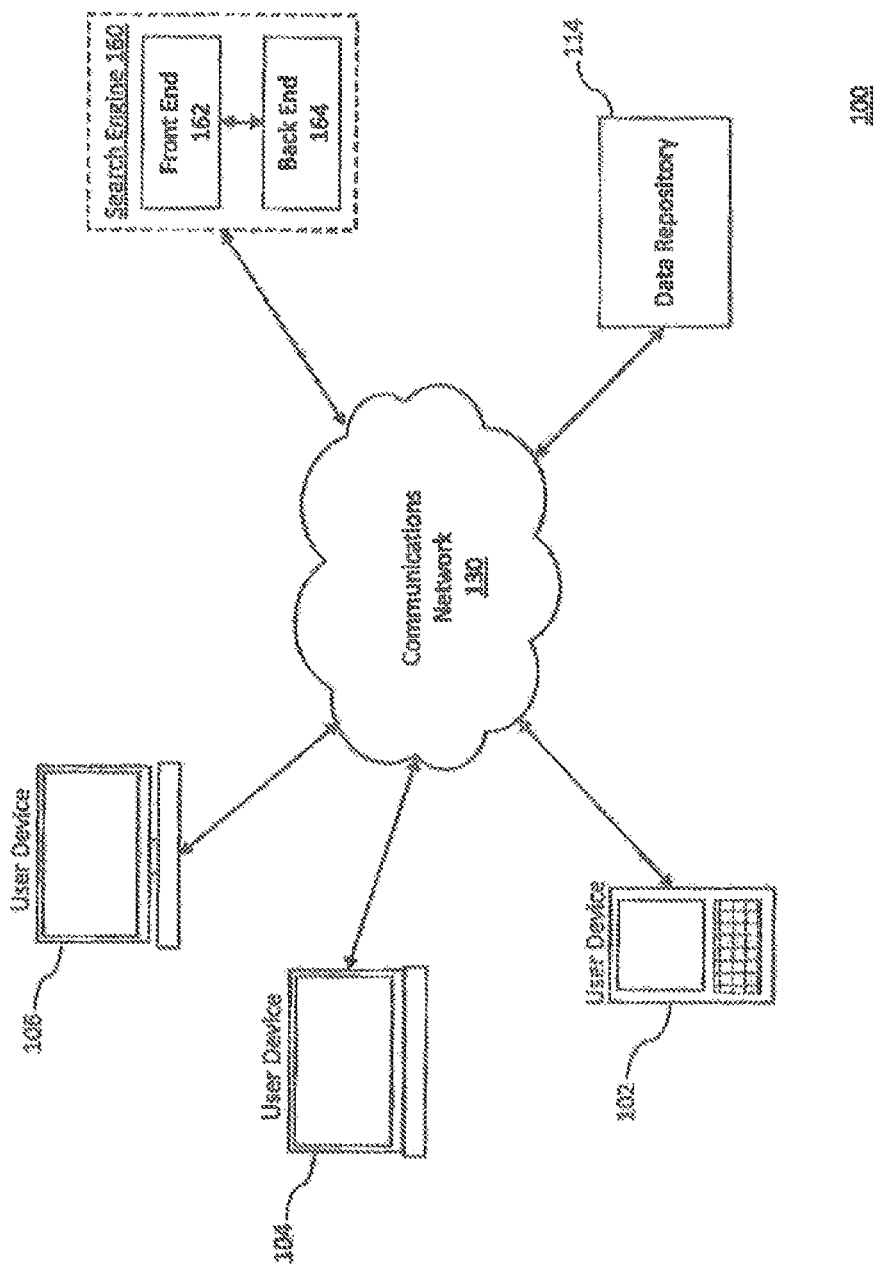
FIG. 1 is a diagram of an exemplary computing environment within which disclosed embodiments may be practiced.

FIG. 1 illustrates an exemplary computing environment 100 within which embodiments of the systems and methods of the present invention may be practiced. In FIG. 1, a search engine 160 and user devices 102, 104, and 106 are interconnected via a communications network 130 to exchange information, for example, search queries and information returned in response to these search queries.

In an embodiment, user devices 102, 104, and 106 can include, but are not limned to, a personal computer, a laptop computer, a notebook computer, a hand-held computer, a personal digital assistant, a portable navigation device, a mobile phone, a smart phone, and any additional or alternate computing device apparent to a person of ordinary skill in the art. Although computing environment 100 includes multiple user devices in communication with search engine 160, persons of ordinary skill in the art will recognize that computer environment 100 may include any number of additional number of mobile or stationary user devices, any number of additional search engines, and any additional number of computers, systems, or servers without departing from the spirit or scope of the disclosed embodiments.

Communications network 130 may represent any form or medium of digital data communication. Examples of communication network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/Internet protocol (TCP/IP). Moreover, communications network 130 may also include one or more mobile device networks, such as a GSM network or a PCS network, that allow user devices, such as user client device 102, to send and receive data via applicable communications protocols, including those described above.

Search engine 160 may include a front end 162, and a back end 164, which is disposed in communication with front end 162. In the embodiment of FIG. 1, front end 162 and back end 164 of search engine 160 may be incorporated into a hardware unit, for example, a single computer, a single server, or any additional or alternate computing device apparent to one or skill in the art. In such an exemplary embodiment, front end 162 may be a software application, such as a web service, executing on search engine 160. However, search engine 160 is not limited to such configurations, and, in additional embodiments, front end 162 may be executed on any computer or server separate from back end 164 without departing from the spirit of scope of the present invention.

Figure 2:
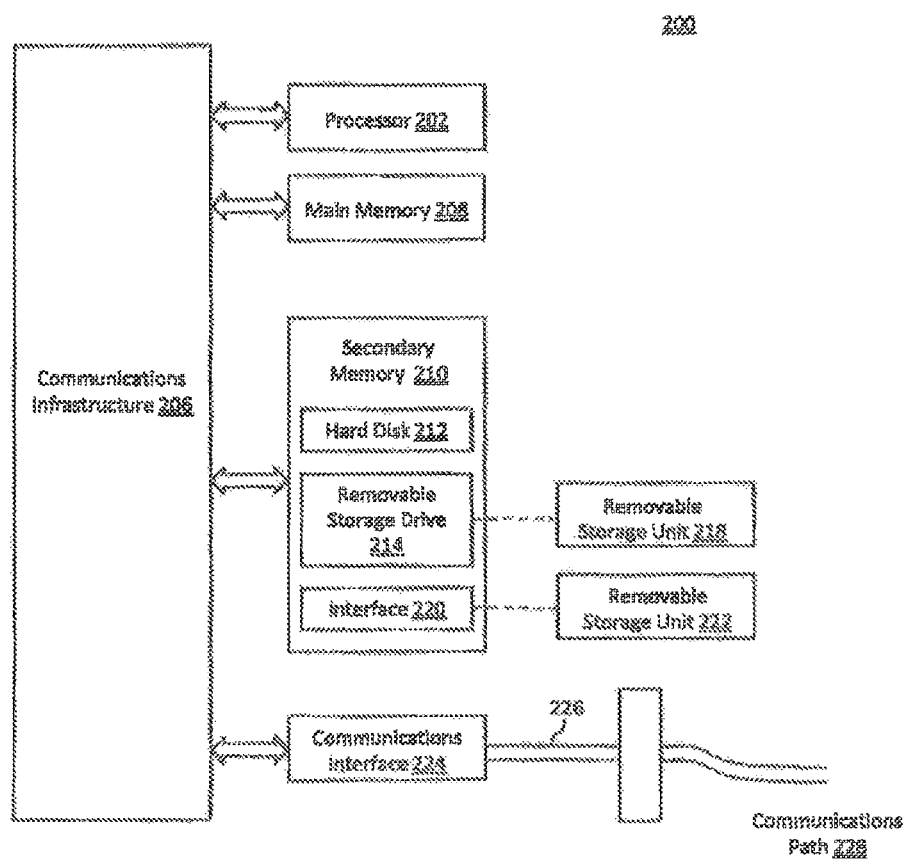
FIG. 2 is a diagram of an exemplary computer system, upon which disclosed embodiments may be implemented.

User computers 102, 104, and 106, and additionally, front end 162 and back end 164 of search engine 160, may represent any type of computer system capable of performing communication protocol processing. FIG. 2 is an exemplary computer system 200 upon which the methods and systems of the present invention may be implemented, according to an embodiment of the invention. Computer system 200 includes one or more processors, such as processor 202. Processor 202 is connected to a communication infrastructure 206, such as a bus or network, e.g., network 130 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other storage medium that is read by and written to by removable storage drive 214. As will be appreciated, the removable storage unit 216 can represent a computer readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Software and data may be transferred via communications interface 224 in the form of signals 226, which may be electronic, electromagnetic, optical or other signals capable of being received by communications interface 224. These signals 225 are provided to communications interface 224 via a communications path (i.e., channel 228). Channel 228 carries signals 226 and may be implemented using wire or cable, fiber optics, an RF link and other communications channels. In an embodiment of the invention, signals 226 comprise data packets sent to processor 202. Information representing processed packets can also be sent in the form of signals 228 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform the computer-implemented methods described herein. Examples of program instructions include, for example, machine code, such as that code produced by a compiler, and files containing a high-level code that can be executed by processor 202 using an interpreter.

Furthermore, the computer-implemented methods described herein can be implemented on a single processor of a computer system, such as processor 202 of system 200. However, in an additional embodiment, these computer-implemented methods may be implemented using one or more processors within a single computer system, and additionally or alternatively, these computer-implemented methods may be implemented on one or more processors within separate computer systems linked via a network.

A search engine, e.g., search engine 160, may maintain a query-click log that stores each search query submitted to the search engine and each corresponding clicked URL. The data stored within the query-click log, e.g., search queries and clicked URLs, can be represented as a bi-partite graph that includes nodes corresponding to recorded search queries and nodes corresponding to clicked URLs. In such a bi-partite graph, an edge connects a query node with a clicked URL node if any user has clicked the URL in response to the query. Further, an edge connecting a query to a URL can be weighted according to a number of clicks that the URL received in response to the query.

Figure 3:
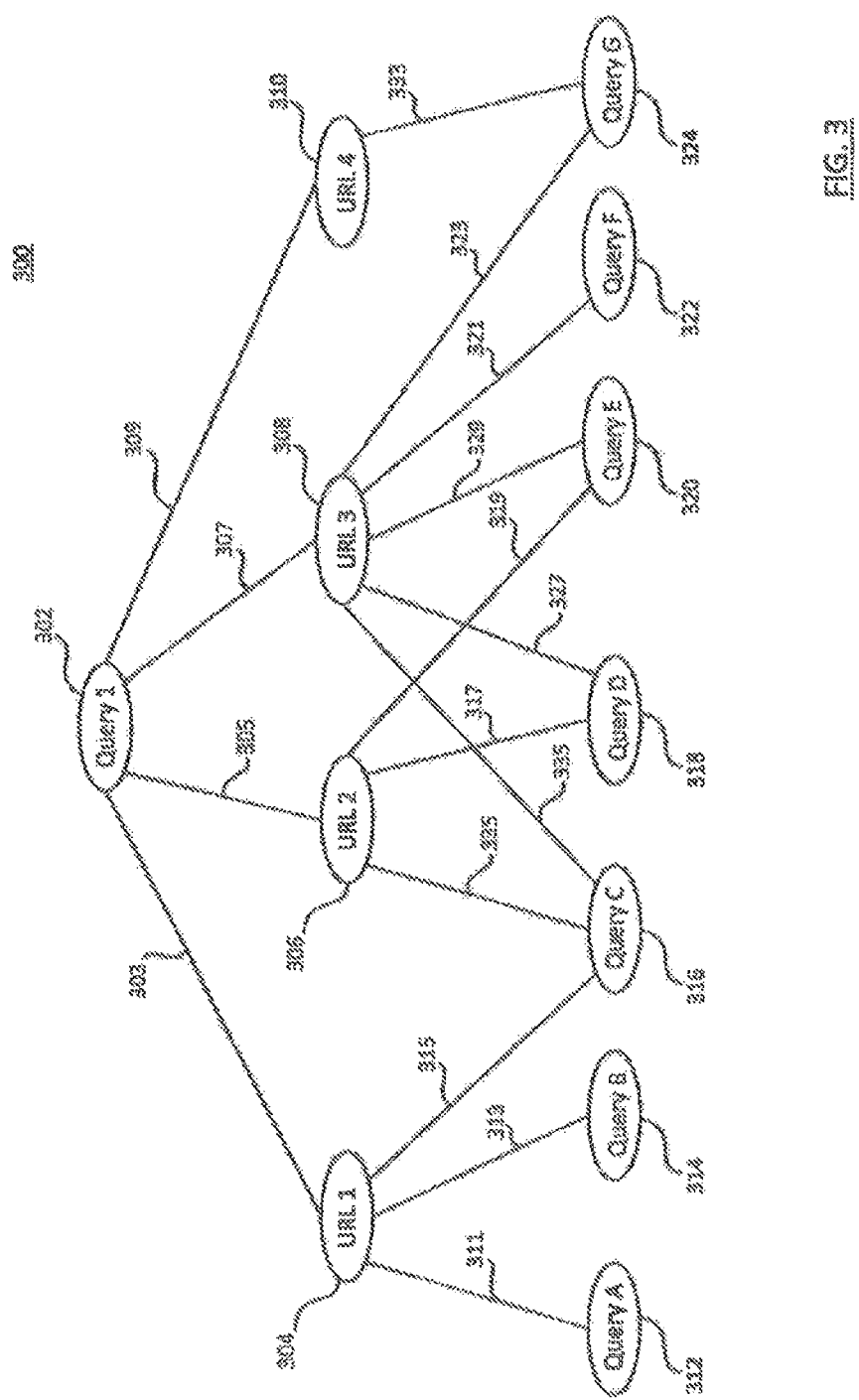
FIG. 3 is an exemplary bi-partite graph representative of data within a query-click log of a search engine, according to disclosed embodiments.

FIG. 3 is an exemplary bi-partite graph 300 that represents search query and URL click data stored within a query-click log of a search engine, according to disclosed embodiments. For example, in response to "Query 1" of node 302, users have clicked "URL 1," "URL 2," "URL 3," and "URL 4," which are represented, respectively, by nodes 304, 306, 308, and 310. As such, edges 303, 305, 307, and 309 respectively connect query nods 302 to URL nodes 304, 306, 308, and 310.

Further, for example, users have clicked on "URL 1" of node 304 in response to search queries "Query A," "Query B" and "Query C," which are represented, respectively, by nodes 312, 314, and 316. As such, edges 311, 313, and 315 respectively connect query nodes 312, 314, and 316 to URL node 304. Similarly, for example, users have clicked on "URL 2" of node 306 in response to "Query C," "Query D," and "Query E," which are represented, respectively, by nodes 316, 318, and 330. As such, edges 325, 317, and 319 respectively connect query nodes 316, 318, and 320 to URL node 306. A similar relationship exists between URL node 308 and query nodes 316, 318, 320, 322, and 324, and between URL node 310 and query node 324.

Although not depicted in FIG. 3, an edge connecting a query to a clicked URL, for example, edge 303 connecting query node 302 to URL node 304, can be "weighted" to reflect a number of times that users have clicked the URL in response to that query. For example, such a weighting may be reflected in a thickness of an edge in graph 300, e.g., a larger number of clicks would be depicted by a thicker line. Additionally or alternatively, an annotation associated with an edge may indicate a number of clicks associated with the particular edge.

In FIG. 3, two query nodes are "related" if each these query nodes share one or more overlapping clicked URLs, i.e., one or more URLs clicked in response to each of the two query nodes. For example, "Query 1" of node 302 is related to "Query B" of node 314, as these query nodes share an overlapping clicked URL, i.e., URL node 304. Further, for example, "Query 1" of node 302 is related to "Query C" of node 316, since these nodes share three overlapping clicked URLs, i.e., URL nodes 304, 306, and 308. As such, a single path links "Query 1" to "Query B," while three distinct paths link "Query 1" to "Query C."

In an exemplary embodiment, a number of distinct paths between two search queries, a length of each of these distinct paths, and a weight assigned to the edges forming these distinct paths may be used to quantify a level of "relation" or "closeness" between two query nodes. For example, as described above, query nodes 302 and 316 may be more closely related than query nodes 302 and 314, since a larger number of paths connects query nodes 302 and 316. Furthermore, query nodes 302 and 314 may be more closely related than query nodes 302 and 312, since the path length between query nodes 302 and 314 is shorter than a corresponding path length between query nodes 302 and 312.

However, embodiments of the invention are not limited to such metrics, and in additional embodiments, a closeness between pairs of query nodes may be determined using any of a number of additional or alternate algorithms and approaches without departing from the spirit or scope of the invention. For example, a forward Markov random wale computation, or a backward Markov random walk computation, can be used to determine a relative closeness between each query node in graph 300 of FIG. 3.

Although graph 300 of FIG. 3 associates pairs of related search queries linked by a single clicked URL, graph 300 is not limited to such embodiments. In additional embodiments, graph 300 may associate two or more query nodes along a path defined by any number of intermediate URL nodes and by any number of intermediate query nodes, without departing from the spirit or scope of the present invention.

Moreover, graph 300 of FIG. 3 associates pairs of query nodes through an overlapping clicked URL node. However, graph 300 is not limited to associations between queries, and in additional embodiments, a graph 300 may associate two or more clicked URLs along a path defined by any number of intermediate query nodes and any number of intermediate clicked URLs.

Figure 4:
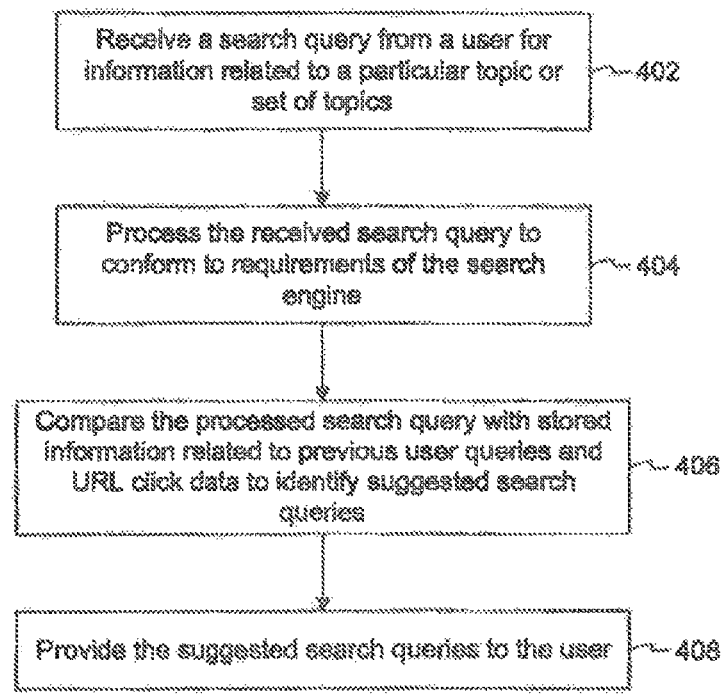
FIG. 4 is a flowchart of an exemplary method for suggesting related search queries to users of a search engine, according to disclosed embodiments.

FIG. 4 illustrates an exemplary method 400 for providing suggested search queries to users of a search engine, according to disclosed embodiments. In step 402, a search engine receives, from a user, a search query for information related to a particular topic, or set of topics, of interest to that user. The received search query may include, for example, one or more keywords, a string of keywords, a URL address, or any combination thereof.

The received search query may then be processed in step 404 to conform to one or more requirements of the search engine. In one embodiment, step 404 may process the received search query to conform with one or more lexical requirements of the search engine, including, but not limited to, transforming capitalized letters into lower-case letters, stripping a leading "www." and a trailing ".com" from an entered URL, an any additional or alternate transformation apparent to one of skill in the art and appropriate to the search engine.

For example, the search engine may receive a search query of the form "www.VirginiaLottery.com." The received query would that be processed in step 404 to strip the "www." and ".com" from the query, and to convert the capital letters into lower-case letters. The pre-processing of step 404 would yield a pre-processed query of the form "virginalottery."

The search engine may then identify one or more search queries that are related to that entered query in step 406, e.g., by comparing the received search query against stored information related to previous search queries and URL click data. In one embodiment, the stored information may include one or more data tuples that are derived from relationships in a bi-partite index or graph, e.g., graph 300 of FIG. 3, and that are indexed to an open-source, enterprise search server, such as Solr.

The stored data tuples may include, but are not limited to, one or more suggested search queries, a set of URLs associated with the suggested search queries, time date stamps associated with the suggested search queries, and any additional or alternate information apparent to one of skill in the art. Further, the stored data tuple may also include aggregated data for the suggested data queries, e.g., one or more of a number click counts associated with links returned by each suggestion, a number of click counts associated with sponsored links returned by the each suggestion, and a frequency at which the suggestion was entered into the search engine.

The search engine may compare the received query against each suggested query in the data tuples in step 406 using an exact match lookup without tokenization of the received search query, and additionally or alternatively, using a full text search of a tokenized search query. In an exemplary embodiment, the search engine may initially apply an exact match lookup to identity related queries, and subsequently tokenize the received query to implement a full text search. The implementation of such a strategy can improve both a relevance and a coverage of related search queries identified in step 406, as compared to the implementation of a single search strategy. Further, the implementation of such a strategy in step 406 can also improve a runtime performance of the comparison process.

In one exemplary embodiment, step 406 may identity a limited number of related search queries, such as, for example, four related search queries. The limited number of related queries may be equivalent to a number of suggested related queries that match the received query, or alternatively, the limited number may represent a subset of those suggested related queries that match the received query.

For example, the subset of the suggested related queries may be identified on the basis of one or more of: (i) a number of clicked URLs linking the received search query with each suggested search query; (ii) a total number of URL clicks associated with each suggested related query; (iii) a number of clicks of sponsored URLs associated with each suggested search query; and (iv) a frequency at which each suggested search query was entered by the user. Further, step 406 may employ any alternate or additional metric to identify related search queries, such as a "closeness" between the received query and each suggested search query, e.g., as determined by a Markov random walk computation.

The suggested related queries may be associated with corresponding time stamps that indicate respective "ages" of the suggested related queries. For example, a time stamp of a suggested related query may indicate a time or date on which the suggested related query was received and logged at the search engine, e.g., search engine 160. In an additional embodiment, the time stamp may indicate a time or date of an event associated with the suggested related query. For example, a suggested related query that relates to "Super Bowl XLIV" may have a time stamp associated with a date on which "Super Bowl XLIV" occurred, i.e., Feb. 7, 2010. However, the suggested related queries are not limited to these exemplary time stamps, and in additional embodiments, the time stamps associated with the suggested related queries may include any additional or alternate information apparent to one of skill in the art and appropriate to the suggested related queries.

In an embodiment, step 406 may identify the subset of suggested related queries based on one or more of the time stamps. For example, the subset may include one or mere suggested related queries having corresponding time stamps that fall outside of a threshold time period, or alternatively, that fall within of a threshold time period. In such embodiments, the threshold time period may be specified relative to a current time, or relative to any additional or alternate time in the past or in the future without departing from the spirit or scope of the disclosed embodiments. Further, for example, the threshold time period may include, but is not limited to, a one hour period, a twelve hour period, a twenty-four hour period, and any additional or alternate fixed or adaptively-determined time period apparent to one of skill in the art and appropriate to the search engine.

The threshold time period may be associated with a seasonal event. For example, the threshold time period may be associated with Valentine's Day (i.e., February $14^{th}$), and may include a time period from February $13^{th}$ to February $15^{th}$. In such embodiments, when the currant date falls within the threshold time period, step 406 may limit the suggested related queries to that subset of suggested related queries having a corresponding time stamp between February $13^{th}$ and February $15^{th}$, and as such, that are associated with Valentine's Day.

In step 408, the search engine provides each of the suggested search queries to the user. In an exemplary embodiment, step 408 may present the suggested search queries to the user in conjunction with search results returned for the received search query. For example, the suggested search queries may be presented to the user at or near a top, or any other portion, of a web page that presents results returned for the received search query. However, in additional embodiments, the suggested search queries may alternatively be presented to the user in advance of results returned for the received search query, thereby providing the user an opportunity to select a reformulated search query. In another embodiment, URL search results corresponding to the suggested search queries may be at least partially displayed in a preview pane, in addition to the initial search results, to allow the user to compare results associated with the received and suggested search queries.

In an additional embodiments, the identification processes of step 406 may leverage an editorial list of exact-match queries to identify one or more URLs associated with search queries received by the search engine in step 402. For example, the user may enter a search query of the form "department of justice" in step 402, which may be processed in step 404 to yield the pre-processed query "departmentofjustice."

In step 406, the search engine can compare the pre-processed query against search queries included within the editorial list to identify one or more search queries of the editorial list that exactly match the pre-processed query, and to identify one or more URLs associated with the matching search queries. For example, the search engine may identify the URL "www.justice.org" as being associated with the pre-processed query. As outlined above, the search engine may provide the identified URL to the user as a suggestion in step 408. In an embodiment, the suggested URL can be provided to the user in step 408 in conjunction with one or more suggested search queries, as discussed above.

In an exemplary embodiment, and as described above in reference to computing environment 100 of FIG. 1, the user may interface with the search engine through a web service that serves as a front end to the search engine, e.g., front end 162 of FIG. 1. The user may enter the search query into the web service in step 402, which may process the received search query in step 404 before forwarding the query to a back end of the search engine, e.g., back end 164 of FIG. 1. In step 406, the back end of the web service may identify suggested search queries related to the received search query, and the back end may transmit the suggested search queries to the user through the web service in step 408.

Figure 5:
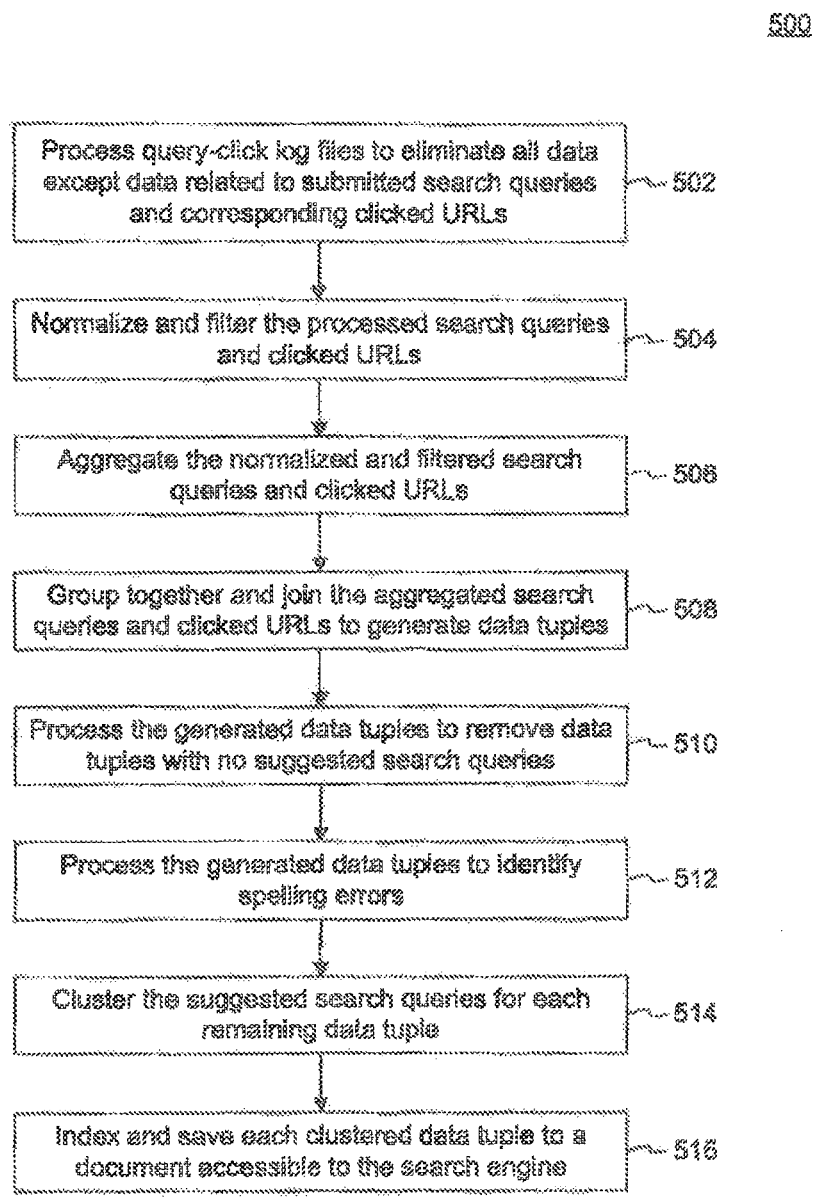
FIG. 5 is a flowchart of an exemplary method for providing suggested search queries based on previous search queries and URL click data, according to disclosed embodiments.

FIG. 5 illustrates an exemplary method 500 for generating suggested related queries based on previous search queries and corresponding URL click data, according to disclosed embodiments. In an exemplary embodiment, information based on previous user search query data and corresponding URL click data can be obtained from a query-click log of a search engine, and may represented by nodes and corresponding edges in a bi-partite click graph, such as bi-partite graph 300 of FIG. 3.

In step 502, one or more query-click log files of a search engine may be processed to eliminate data except that data related to search queries and to corresponding clicked URLs. For example, in such a data set, a single submitted query may have multiple clicked URLs, e.g., query 302 in FIG. 3 is associated with clicked URLs 302, 304, 306, and 308. The processing of step 502 can employ one or more scripts (e.g., a PERL script) to scrub the query-click log files to yield search query records, sponsored URL click records (e.g., records including sponsored URL click data), and web-search organic URL click records (e.g., records including web-search organic URL click data). Further, the processing of step 502 can be performed in adherence to one or more legal restrictions or institutional requirements.

The data processed in step 502 may then be normalized and filtered in step 504. For example, the normalization processes of step 504, as applied to the search query records and URL click records (e.g., organic URL click (K) records and sponsored URL click (SL) records), can convert uppercase letters in the search query records or URL click records to lower-case letters, and can trim the search query records or URL click records to a particular length.

Further, for example, the normalization and filtration processes of step 504, as applied to the search query records, can perform one or more of the following operations:

(i) block one or more search query records that are null or that include only a dash;

(ii) block one or more search query records that have length greater than a certain length, e.g., forty characters;

(iii) block one or more search query records that represent URLs or that are URL-like queries;

(iv) block one or more search query records that include special query operators;

(v) block one or more search query records of length greater than a certain length that do not include certain characters, e.g., a length greater than five characters that does not include at least one ASCII letter;

(vi) block one or more search query records that include next page (i.e., only allow those search query records that include first page);

(vii) block one or more search query records that are exact matches with restricted content;

(viii) block search query records according to an in-string black list and an in-white list; and (ix) block one or more query records based on time stamps associated with the query records.

For example, the restricted content may include, but is not limited to, classified content and content of an adult or pornographic nature. However, the restricted content is not limited to such examples, and in additional embodiments, the restricted content may include, but is not limited to, content that is restricted based on one or more parental controls set for a user; content that is restricted baaed on user authorization levels; content that is restricted based on fee or subscription-based access levels; content that is restricted based on geographic area or time zone; content that is restricted based on user or client device type or connection status; and any additional or alternate content apparent to one of skill in the art and appropriate to URL click records.

In an embodiment, and as discussed above, the query records can be associated with corresponding time stamps that indicate respective "ages" of the query records. For example, the time stamp may indicate a time or date on which a query record was logged into the query-click log of a search engine. In an additional embodiment, the time stamp may indicate a time or date of an event associated with the query record, or may indicate any additional or alternate information apparent to one of skill in the art and appropriate to the query records.

For example, the normalization and filtration processes of step 504 may block one or more query records having corresponding time stamps that fall outside of a threshold time period, or alternatively, that fall within a specified time period. In such embodiments, the threshold time period may be specified relative to a current time, or relative to any additional or alternate time in the past or in the future without departing from the spirit or scope of the disclosed embodiments. Further, for example, the threshold time period may include, but is not limited to, a one hour period, a twelve hour period, a twenty-four hour period, and any additional or alternate fixed or adaptively-determined time period apparent to one of skill in the art and appropriate to the search engine.

In en exemplary embodiment, the in-string black list may be employed to block any search query record that includes a character substring listed within the in-string black list. Further, any search query record blocked due to the in-string black list may then be compared to the in-string white list. If the search query record is listed within the in-string white list, then step 504 overrides the in-string black list and maintains the search query record. In such an embodiment, the in-string white list acts as an override for the filtration and normalization step 504 that allows the in-string black list to block queries that may be associated with restricted content.

Further, for example, the filtration processes of step 504, as applied to URL click records, e.g., organic URL click (K) records and sponsored URL click (SL) records, can perform one or more of the following operations:

(i) block one or more URL click records that are null or that include only a dash;
(ii) block one or more URL click records of length greater than a certain length, e.g., 250 characters;
(iii) block one or more URL click records that point to proprietary services (e.g., AOL search);
(iv) block one or more URL click records that are exact matches with restricted content;
(v) block one or more URL click records associated with specified domains, e.g., classified domains; and
(vi) block one or more URL click records based on time stamps associated with the URL click records.

For example, the restricted content may include, but is not limited to, classified content and content of an adult or pornographic nature. However, the restricted content is not limited to such examples, and in additional embodiments, the restricted content may include, but is not limited to, content that is restricted based on one or more parental controls set for a user; content that is restricted based on user authorization levels; content that is restricted based on fee or subscription-based access levels; content that is restricted based on geographic area or time zone; content that is restricted based on user or client device type or connection status; and any additional or alternate content apparent to one of skill in the art and appropriate to URL click records.

In an embodiment, and as discussed above, the URL click records can be associated with corresponding time stamps that indicate respective "ages" of the URL click records. For example, the time stamp may indicate a time or date on which a URL click record was logged into the query-click log of a search engine, or may indicate any additional or alternate information apparent to one of skill in the art and appropriate to the query records.

For example, the filtration processes of step 504 may block one or more URL click records having corresponding time stamps that fall within outside of a threshold time period, or alternatively, that fall within a specified time period. In such embodiments, the threshold time period may be specified relative to a current time, or relative to any additional or alternate time in the past or in the future without departing from the spirit or scope of the disclosed embodiments. Further, for example, the threshold time period may include, but is not limited to, a one hour period, a twelve hour period, a twenty-four hour period, or any additional or alternate fixed or adaptively-determined time period apparent to one of skill in the art and appropriate to the search engine.

The normalized and filtered records may then be processed in step 506 to aggregate the search query records and URL click records by query type. For example, step 506 may aggregate the search query records by individual query, and may aggregate the URL click records (and potentially, the sponsored click records) by a combination of search query and clicked URL. The aggregation of step 506 can compute, for each query in the search query records, an overall click count (e.g., a number of clicks resulting from the query), a sponsored link click count, and a frequency at which the query is entered into the search engine.

Once aggregated by query in step 508, the aggregated search query records and URL click records may be grouped and joined to form data "tuples." These data tuples may be grouped according to individual queries. However, the present invention is not limited to such a grouping, and in an additional embodiment, the search query records and the URL click records may be grouped according to clicked URL, or any other parameter, without departing from the spirit or scope of the disclosed embodiments.

For example, individual search queries from within the search query records can be assigned a data tuple as one of a set of suggested data queries. The data tuple can also include aggregated data associated with each suggested data query, including, but not limited to, an overall click count, a sponsored link click count, and a frequency at which the suggestion was entered into the search engine.

For example, a data tuple generated in step 508 may have the following form

{primeQuery, {{suggested query, slClickCount, clickCount, frequency} . . . }, in which "suggested query" is one of a set of suggested search queries related to each other through an overlapping URL clicks, as described in FIG. 3, and "slClickCount," "clickCount," and "frequency" represent, respectively, the sponsored link click count, the overall click count, and the frequency associated with the suggestion. In additional embodiments, the data "tuples" generated in step 508 may include any number of suggested search queries without departing from the spirit or scope of the invention.

The generated data tuples may also incorporate time stamps associated with the suggested search queries. As discussed above, a time stamp of a suggested search query may indicate a time or date on which the suggested search query was received and logged at the search engine, a time or date of an event associated with the suggested related query, or any additional or alternate time or date apparent to one of skill in the art and appropriate to the suggested search query. In such embodiments, a data tuple generated in step 508 may have the following form:

{primeQuery, {{suggested query, slClickCount, clickCount, frequency, time stamp} . . . }, in which "suggested query" is one of a set of suggested search queries related to each other through an overlapping URL clicks, as described in FIG. 3, and "slClickCount," "clickCount," "frequency," and "time stamp" represent, respectively, the sponsored link click count, the overall click count, the frequency, and the time stamp associated with the suggestion.

Furthermore, the generated data tuples may also include a set or sets of URLs that link each of the set of suggested search queries. In such an embodiment, the data tuples generated by step 508 may take the form:

{primeQuery, {{{URLs}, suggested query}, . . . }}, wherein the set of suggested queries is formatted to include aggregated data as described above.

The generated data tuples may then be processed in step 510 to discard those tuples that lack suggested search queries (for example, those individual search queries that have no related queries are removed from the data set). Spelling errors may then detected within the generated data tuples in step 512. In an exemplary embodiment, the identification in step 512 may contextually identify spelling errors using a Damerau-Levenshtein distance algorithm. If spelling errors are identified within a data tuple, step 512 discards that data tuple.

Step 514 then clusters the suggested search queries associated with each of the remaining data tuples using, for example, and an open-source clustering program or engine. For each dynamically generated cluster, step 514 selects a suggested search query characterized by, for example, the largest click count and the highest query frequency. However, the clustering of step 514 can also be configured to return multiple suggested search queries that include, for example, the suggested search query exhibiting the largest click count and the suggested search query exhibiting the highest frequency. Moreover, step 514 can also return the suggested search query having the greatest potential for monetization, for example, the suggested search query having the largest sponsored click count.

In an exemplary embodiment, step 514 implements the clustering program or engine and may send each of the suggested related queries to the clustering program or engine initially as a title and then subsequently as a snippet, and may then repeat the transmission multiple times for each suggested related query. Further, the stop words list of the clustering program or engine may be replaced with an alternate list associated with the search engine without departing from the spirit or scope of the invention.

Each clustered data tuple is men indexed and saved as a document accessible to the search engine in step 516. Further, in an exemplary embodiment, the data tuples output from the clustering of step 514 are indexed in an open-source, enterprise search server, including, but not limited to, Solr. In addition, step 516 may discard duplicate suggestions in each stored and indexed data tuple by conflating stored suggestions and generating a corresponding signature.

In the embodiments described above, query-click log data is processed and subsequently grouped according to queries. However, the present invention is not limited to such groupings, and in additional embodiments, the query-click log data could be alternately grouped according to URL. For example, grouping the query-click log data according to URLs may require less processing and less storage space than a comparable grouping by query. Further, in such an embodiment, queries for each URL group may be better focused.

For example, and in reference to bi-partite graph 300 of FIG. 3, a group corresponding to "URL 3," i.e., node 308, would include {"Query 1," "Query C," "Query D," "Query E," "Query F," "Query G"}. However, a group corresponding to "Query 1," i.e., node 302, would include {"URL 1," "URL 2," "URL 3," "URL 4}, as well as {"Query A," "Query B," "Query C," "Query D," "Query E," "Query F," "Query G"}. Due to the larger amount of data, step 512 may more effectively identify spelling errors within groupings by query than in similar groupings by URL.

Further, as described above in reference to FIG. 4, a search engine can compare a received search query against suggested search queries in a Solr index to identify suggested related queries using a full text search approach, or alternatively, an exact match lookup approach. For an exact match lookup approach, a grouping by query may be more effective because that grouping provides a fuller set of results for comparison. However, if URL groupings were used in conjunction with exact match lookup approach, the matching process may return a set of synonyms of the related query, but may not return a set of unique related queries. In such an implementation, the exact match lookup approach may provide a larger number of suggested search queries, but may provide poorer coverage than a similar process employing a full text search.

In an exemplary embodiment, the relevance of suggested search queries obtained using the full text approach in URL groupings may be improved by "on the fly" clustering. For example, "on the fly" clustering would perform the clustering of step 514 during the runtime of the search engine, which results in additional computationally-intensive work (e.g., tens of milliseconds of additional work per request) being performed at runtime. Furthermore, in such an embodiment, the identification of spelling errors within step 512 could also be performed at runtime at a cost of a few additional milliseconds.

In the embodiments described above, suggested search queries are provided to a user based on, for example, previous user queries and corresponding URL click data. However, in some situations, these user queries represent now queries that have no counterpart within the query-click log of the search engine. Under these circumstances, the approach of FIG. 5, when used alone, may identify and suggest related search queries that are limited in coverage. Additionally, the approach of FIG. 5, under certain circumstances, may favor less specific queries that may not have a high payoff for the user, i.e., that may not return search results of sufficient relevance.

In an exemplary embodiment, the search engine may leverage user session data to suggest query reformulations that have a high payoff for the user, thereby improving the quality of the suggestions over those simply to related co-occurring search query terms. For example, while "baseball" and "games" often occur simultaneously in a single user query, reformulating the "baseball" query to include the term "games" may not add much additional value to the query. However, adding "tickets," "cards," or "scores" to a query that includes "baseball" is more likely to help the user find the information they seek.

Figure 6:
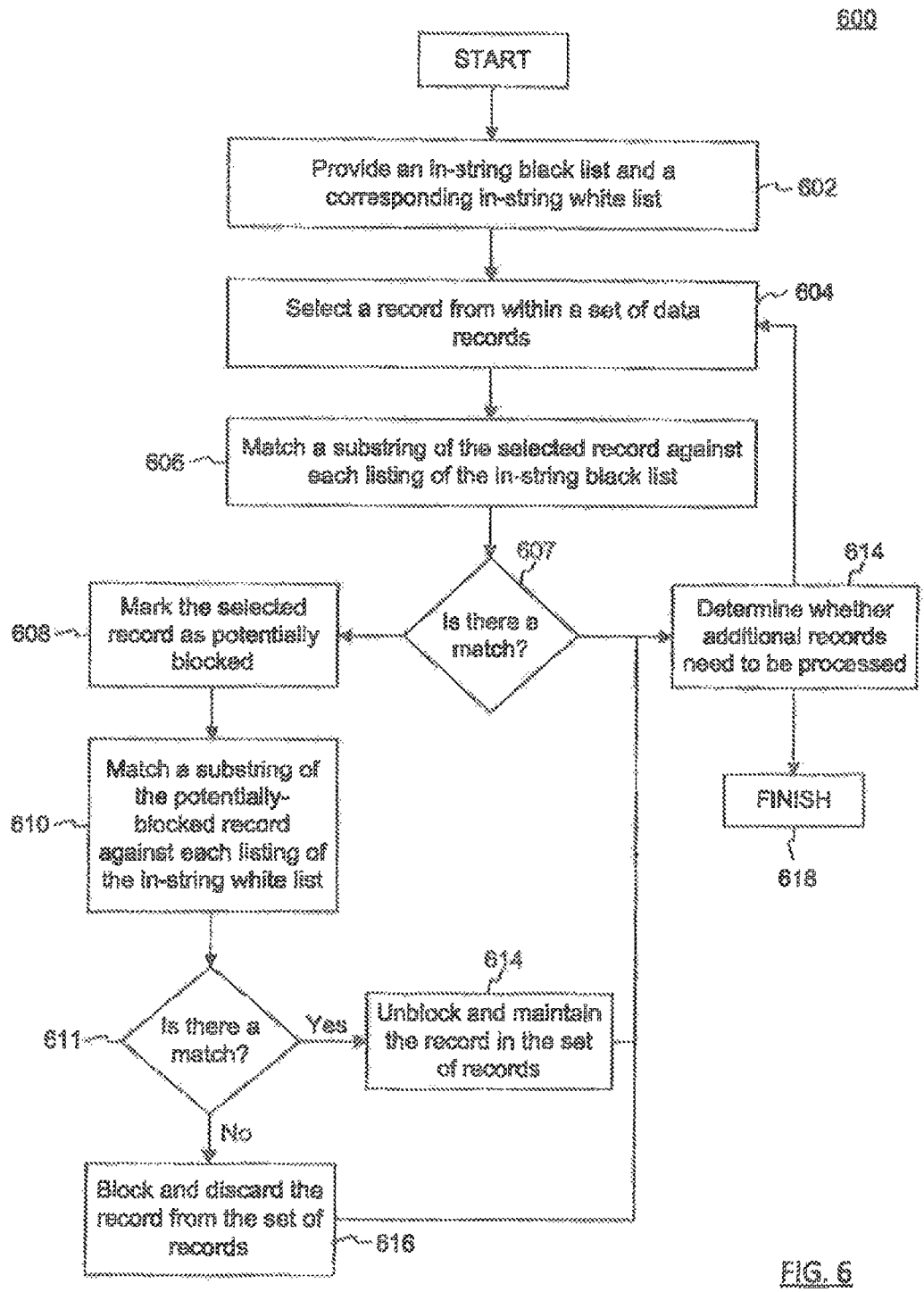
FIG. 6 is a flowchart of an exemplary method for filtering restricted content records from a set of data records, according to disclosed embodiments.

FIG. 6 illustrates an exemplary method 600 for filtering restricted content from a set of search query records and clicked URL records, according to disclosed embodiments. In an embodiment, exemplary method 600 may be incorporated into step 504 of method 500 to filter search query records and URL click records. However, in additional embodiments, exemplary method 600 may applied to any additional set of query or click data, or any other set of comparable data, without departing from the spirit or scope of the present invention.

In an embodiment, the restricted content may include, but is not limited to, classified content and content of an adult or pornographic nature. However, the restricted content is not limited to such examples, and in additional embodiments, the restricted content may include, but is not limited to, content that is restricted based on one or more parental controls set for a user; content that is restricted based on user authorization levels; content that is restricted based on fee or subscription-based access levels; content that is restricted based on geographic area or time zone; content that is restricted based on user or client device type or connection status; and any additional or alternate content apparent to one of skill in the art and appropriate to URL click records.

Step 602 provides an in-string black list that includes a list of queries and URLs of a restricted nature, and an in-string white list that overrides the in-string black list. In an exemplary embodiment, the in-string black list blocks any record having a character substring or token included within the black list. In such an embodiment, the in-string white list would serve as an override that allows for a more aggressive in-string blacklist. For example, "sex" may be included within the black list, but "essex", "middlesex", and "sex and the city" may be included within the in-string white list.

Step 604 then selects a record from a set of data records, e.g., one of the search query records and the URL click records, and a character substring of the selected record is matched against each listing within the in-string black list in step 606. If the substring of the selected record exactly matches a listing in the in-string black list in step 607, then step 608 marks the selected records as potentially blocked.

A character substring of the potentially-blocked record is then matched against each entry of the in-string white list in step 610. If the substring of the potentially-blocked record exactly matches a listing in the in-string white list in step 611, then the selected record is unblocked in step 612, and the exemplary method passes to step 614, which determines whether additional records require processing.

However, if no substring of the potentially-blocked record were to match a listing in the in-string white list in step 611, than the search query or URL click record is blocked and is discarded in step 616. The exemplary method then passes to step 614, which determines whether additional records are to be processed.

If no substring of the selected record were to match a listing within the in-string black list in step 607, then the selected record is maintained within the set of data records, e.g., either the search query records or the URL click records. In such an instance, method 600 performs no comparison of the substring of the selected record with the in-string white list. The exemplary method then passes to step 614, which determines whether additional records require processing.

If step 614 determines that additional search query records or the URL click records require processing, then an additional record is selected in step 604. However, if no additional records are to be processed, then method 600 is complete in step 618. At this point for example, method 600 could then pass back to step 504 of method 500, which continues the normalization and filtration of the search query records and URL click records.

In an exemplary embodiment, each of the search query and URL click records identified as being of a restricted nature, i.e., those matching the in-string black list and not matching the in-string white list, may be automatically added to the in-string black list to dynamically improve the coverage of the in-string black list and to generate. Further, in additional embodiments, step 604 may match substrings of each search query record and URL click records against one or more additional or alternate lists to identify adult URLs and/or queries without departing from the spirit or scope of the invention.

In an exemplary embodiment, an editorial list of exact-match queries may be used prior to step 602 as a block list to identify one or more URLs associated with search queries that exactly match search queries of the editorial list. For example, one or more URLs that point to restricted content of an adult nature may be identified using the editorial list. Further, the in-string black list, and additionally or alternatively, the in-string white list, may be defined based on those search queries and clicked URLs identified using the editorial list.

Additionally, or independently, any determination of a search query or URL that points to restricted content may be subject to thresholding. In such an embodiment a search query that points to a restricted-content URL, e.g., a URL within the in-string black list or the editorial list, will be labeled as a restricted-content query if more than a threshold value of URLs clicked in response to the search query are restricted-content URLs. For example, the threshold value may be fifty percent, although persons of skill in the art would recognize that any alternate threshold value may be used without departing from the spirit or scope of the present invention. Further, this process may be repeated one or more times to increase a coverage of restricted-content search queries and clicked URLs, and to construct automatically-generated lists of restricted content URLs and search queries.

In step 606, the selected search query or URL click record is matched against each listing within the in-string black list. However, the present invention is not limited to such a list, and additionally or alternatively, the selected search query or URL click record may be compared against one or more of the in-string black list, the editorial list, and the automatically-generated lists of adult URLs and search queries without departing from the spirit or scope of the present invention.

Further, the embodiments of FIG. 6 are described in terms of the identification and discarding of restricted-content search queues. However, the filtration processes of FIG. 6 are not limited to such query-based processes, and in additional embodiments, method 600 may identify one or more restricted-content URLs from one or more of the editorial list, the in-string black list, and the automatically-generated lists without departing from the spirit or scope of the present invention.

Moreover, although the embodiments of FIG. 6 are described in terms of restricted-content search queries and URLs, the present invention is not limited to such content. In additional embodiments, the in-string black list, the editorial list, and the automatically-generated lists may be employed by method 600 to filter content related to any additional or alternate subject without departing from the spirit or scope of the invention. Further, the listing within the in-string white list may further be expanded to maintain records for search queries and clicked URLs related to any additional or alternate subject, for example, finance or banking, without departing from the spirit or scope of the present invention.

Figure 7:
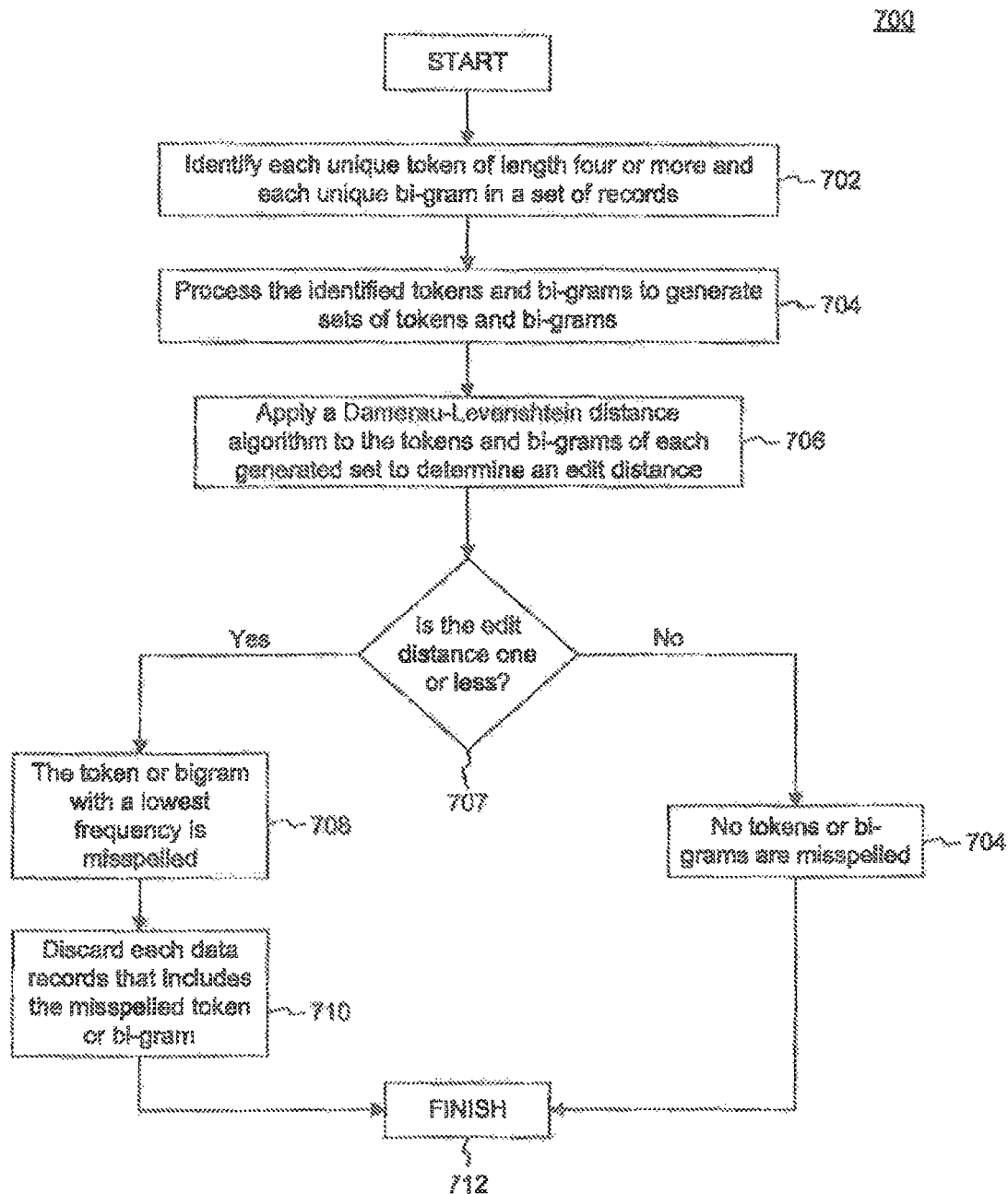
FIG. 7 is a flowchart of an exemplary method for identifying spelling errors within search query and URL click records, according to disclosed embodiments.

FIG. 7 illustrates an exemplary method 700 for identifying spelling errors within search query records and URL click records, according to an embodiment of the present invention. In an embodiment, exemplary method 700 may be incorporated into step 512 of FIG. 5 to identify spelling errors within the generated data tuples and to discard data tuples that include spelling errors. However, one of skill in the art would recognize that the exemplary method 700, as described herein, could identify spelling errors within any additional or alternate set of data records without departing from the spirit or scope of the invention.

In step 702, a set of search query or URL click records, e.g., a set of data tuples generated in step 508, may be processed to identify each unique token of length of at least a threshold length (e.g., a length of four or more) and each unique bi-gram. Step 704 than further processes the identified tokens and bi-grams to generate one or more sets of tokens and bi-grams, wherein each token or bi-gram in a set has a length within one of each additional token or bi-gram in the set.

In step 706, a Damerau-Levenshtein distance algorithm is applied to the tokens and bi-grams within each of the generated sets to determine an edit distance for the tokens and bi-grams of each set. If the edit distance obtained from the Damerau-Levenshtein distance algorithm is one or less in step 707, then the token or bi-gram with a lowest frequency is considered misspelled in step 708, and any query or click record that includes the misspelled token or bi-gram is considered misspelled and is discarded in step 710. Method 700 then passes to step 712, in which the process is completed. However, if the edit distance is greater than one for each token or bi-gram in step 707, then step 714 determines that no tokens or bi-grams are misspelled in the set, and the exemplary method is then completed in step 712. For example, once completed in step 712, exemplary method 700 may pass back to step 514 of FIG. 5, which clusters the suggested search queries within the remaining data tuples.

Figure 8:
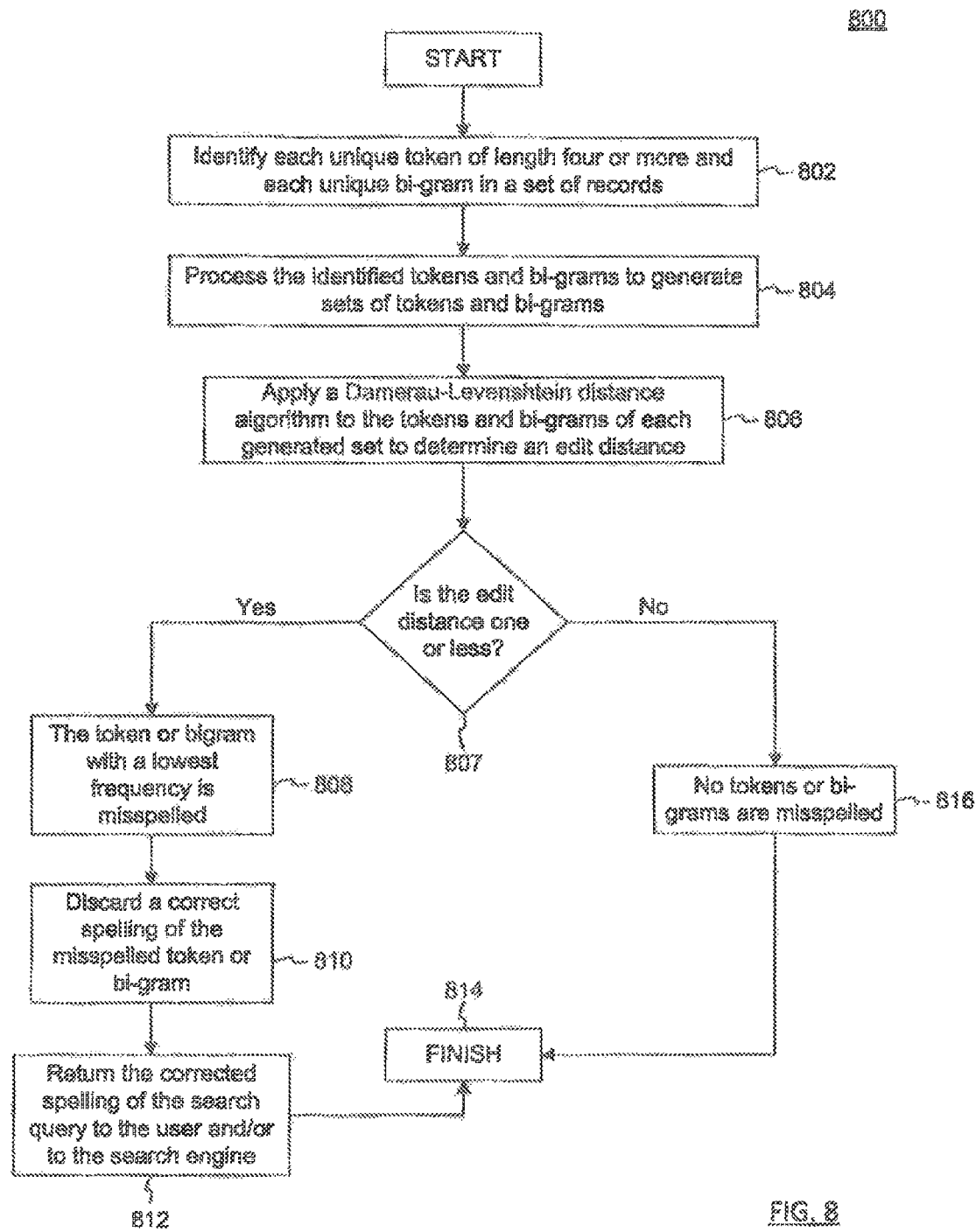
FIG. 8 is a flowchart of an exemplary method for identifying and correcting spelling errors within search query records and URL click records, according to disclosed embodiments.

FIG. 8 illustrates an exemplary method 800 for identifying and correcting spelling errors within search query and URL click records, according to an embodiment of the invention. Similar to the embodiment of FIG. 8, exemplary method 800 may be incorporated into step 514 of FIG. 5 to identify spelling errors within the generated data tuples. However, one of skill in the art would recognize the exemplary method 800, as described herein, could be applied to any set of additional or alternate data to identify spelling errors.

Step 802 processes a set of search query and URL click records, e.g., a set of data tuples generated in step 508, to identify each unique token of length four or more and each unique bi-gram. Step 804 then processes the identified tokens and bi-gram to generate one or more sets of tokens and bi-grams, wherein each token or bi-gram in a set has a length within one of each other token or bi-gram in the set.

In step 806, a Damerau-Levenshtein distance algorithm is applied to the tokens and bi-grams within each of the identified sets to determine an edit distance for the tokens and bi-grams of each set. If the edit distance obtained from the Damerau-Levenshtein distance algorithm is one or less in step 807, then the token or bi-gram with a lowest frequency is considered misspelled in step 806.

However, in contrast to the exemplary method of FIG. 8, step 810 determines a correct spelling of the token or bi-gram with the lesser frequency. In one embodiment, step 810 determines the correct spelling of the less-frequent token or bi-gram by following a "chain of correction" in order to identify a most frequency-appearing permutation of the misspelled token or bi-gram, which is deemed to be the correct spelling.

For example, step 808 could determine that "ophra" is misspelled using the Damerau-Levenshtein distance algorithm. Step 808 could then follow the corresponding correction chain to identify the most frequently-appearing permutation of the misspelled token or bi-gram, as outlined below:

"ophra" (12) ↔ "opra"(10) ↔ "oprah" (120).

wherein within the chain of correction, the token or bi-gram is included within quotes and a corresponding frequency at which the token or bi-gram appears in the results is included within parentheses. As such, step 810 would determine that "oprah" is the most-frequent permutation of the misspelled token or bi-gram, and as such, the "oprah" is the correct spelling.

In additional embodiments, thresholding may be incorporated into method 800 to improve an accuracy of the identified corrections. For example, step 810 may incorporate a frequency threshold into the determination of a property-spelled token or bi-gram. In such an embodiment, the most-frequent permutation of the token or bi-gram would only be considered a correct spelling if that token or bi-gram were to appear at a frequency equal to or above the threshold frequency.

Step 812 then returns the corrected spelling of the misspelled query as a suggested query or URL to the end user, and additionally or alternatively, to the search engine. For example, step 812 may provide the suggested query or URL to the user through a web service associated with the search engine. Further, for example, step 812 could forward the particular data record, i.e., the query or URL, that includes the misspelled token or bi-gram to a back-end of the search engine both in its original, misspelled form, and in its corrected form. Method 800 then passes to step 814, in which the process is completed.

However, as descried above, if the edit distance is greater than one for each token or bi-gram in step 807, then step 816 determines that no tokens or bi-grams are misspelled in the set, and the exemplary method is then completed in step 814. For example, once completed in step 814, exemplary method 800 may pass back to step 514 of FIG. 5, which clusters the suggested search queries within the remaining data tuples.

In an exemplary embodiment, method 800 may be implemented independently of method 500 of FIG. 5. In such an embodiment, method 800 may group together search queries (and additionally or alternatively, clicked URLs) that are within one edit distance of one another. Step 808 can then select the most-frequently appearing search query as the correctly-spelled search query within the group, and pairs of misspelled queries and correctly spelled queries may be stored within a database for rapid lookup during runtime.

In an additional embodiment, a threshold, or confidence value, based on, for example, a frequency at which the most popular search query appears within the group, may be implemented to select the correctly-spelled search query within each group. For example, the most-frequently appearing search query within a group would be considered the correct spelling if that search query were to appear at a frequency equal to or above the threshold frequency.

In the embodiments of FIGS. 7 and 8, tokens or bi-grams in an identified set that differ only in that the longer of the tokens or bi-grams ends in an "s" are not considered misspelled, even though the edit distance may be one or less. In such an embodiment, these tokens or bi-grams would be considered singular and plural forms of the same token or bi-gram.

As described above, methods 700 and 800 identify spelling errors algorithmically using the Damerau-Levenshtein distance algorithm, and without the use of dictionary lookups. As such, these embodiments can determine, for example, that "presidential polls" is spelled correctly and that "presidential poles" is misspelled, and can catch, for example, misspellings such as "e-bay," "e bay," "ebey," and in some cases, "e bey."

However, in some instances, false positives may result from the application of methods 700 end 800 to a particular set of records. For example, these exemplary methods may identify that "james" and "names" are misspellings of each other, and that "socialism" and "socialist" are misspellings of the same word. Further, these exemplary methods may also fall to detect tokens or bi-grams that are grossly misspelled.

In the embodiments described above, suggested search queries are provided to users based on a comparison between a received search query and stored query-click data. However, the processes described above are not limited to providing suggested search queries, and in additional embodiments, a search engine may provide online content that is popular with and demanded by users. For example, the exemplary processes described above may incorporate a demand algorithm associated with a content management system to identify high-demand online content (e.g., digital images, digital videos, blogs, articles, etc.) associated with one of more of a topic associated with the received search query or a characteristic of the user.

In an exemplary embodiment, a demand algorithm of a concept management system may be leveraged to generate a "concept cloud" that includes online content associated with one or more similar topics, concepts, or ideas. For example, the demand algorithm may be implemented to identify content associated with "Icelandic volcanic ash" that is popular with and demanded by users. Such content may include, but is not limited to, regions affected by the volcanic ash, schedules of flights affected by the volcanic ash, content associated with alternate forms of transportation within the affected regions (e.g., train schedule), content associated with available lodging within the affected regions, or weather forecasts. In such embodiments, the identified content by be maintained in a storage device accessible to the search engine, e.g., a storage device associated with a content management system or server within system 100.

As discussed above, the search engine may receive a search query for "volcanic ash Iceland," and the exemplary processes of FIGS. 4 and 5 may identify one or more suggested search queries based on stored query-click logs and may provide the suggested search queries to the user. In an embodiment, the search engine may also identify and access stored online content corresponding to a "concept cloud" associated with the received search query, and may provide one or more elements of the stored content to the user in conjunction within the suggested search queries. For example, the search engine could access the "concept cloud" associated with "Icelandic volcanic ash," and may provide to the user information of flights affected by the volcanic ash and weather reports from the affected regions that are popular and in high demand by other users.

In yet another embodiment, the search engine may be used to generate requests for Internet users to create online content about the query, or suggested queries. For example, if people are frequently entering queries that read, "volcano," but the search engine determines that people are actually interested in the suggested query "Icelandic volcano ash," then the search engine may inform a demand algorithm that online content should be generated about "Icelandic volcano ash" instead of about "volcano," which was the more frequent but less relevant query. Thus, the search engine may be used to analyze search queries, generate suggested queries, and use such information to request the submission of more relevant online content.

Accordingly, the present disclosure also includes systems and methods for generating a suggested search query using one or more of the above-described embodiments, generating a request for submission of online content based on the suggested search query, and sending or displaying the request to one or more Internet users.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

Further, other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following listing of exemplary claims.

What is claimed is:

1. A computer-implemented method for filtering restricted content, the method comprising the following operations performed by one or more processors:
retrieving an in-string black list and an in-string white list of search queries;
receiving a user search query string;
comparing a character substring of the received user search query string against the in-string black list to determine if the character substring of the received user search query string matches at least one listing in the in-string black list;
marking the received user search query string as potentially blocked if the character substring is determined to match the at least one listing in the in-string black list;
matching the character substring of the potentially blocked received user search query string against each entry of the in-string white list;
determining that the character substring of the potentially blocked received user search query string does not exactly match a listing in the in-string white list; and
as a result of determining that the character substring of the potentially blocked received user search query string does not exactly match a listing in the in-string white list, adding the received user search query string to the in-string black list.

2. The method of claim 1, further comprising:
unblocking the received user search query string if the character substring exactly matches a listing in the in-string white list.

3. The method of claim 1, further comprising:
blocking the received user search query string if the character substring does not exactly match a listing in the in-string white list.

4. The method of claim 1, further comprising:
determining whether additional user search query strings are to be processed when the character substring does not exactly match a listing in the in-string white list.

5. The method of claim 1, further comprising:
comparing a substring of the received user search query string against an editorial list or automatically generated lists of adult URLs and search queries; and
marking the received user search query string as potentially blocked if the substring is determined to match the at least one listing in the editorial list or automatically generated lists of adult URLs and search queries.

6. The method of claim 1, further comprising:
determining a threshold value of URLs clicked in response to the search query string; and
labeling the search query string within the in-string black list that points to a restricted content URL as a restricted content query if more than the threshold value of URLs are clicked in response to the search query string.

7. The method of claim 1, further comprising:
overriding the in-string black list to allow a character substring included within the in-string black list to be included in the in-string white list.

8. The method of claim 1, further comprising:
expanding the in-string white list to maintain records for search queries and clicked URLs related to at least one of finance or banking.

9. The method of claim 1, wherein the in-string black list includes entries associated with a parental control set by a user, a user authorization level, a fee or subscription based access level, a geographic area or time zone restriction, or a client device and connection status restriction.

10. A system for filtering restricted content, comprising:
a storage medium that stores instructions; and
one or more processors configured to execute the instructions to:
- retrieve an in-string black list and an in-string white list of search queries;
- receive a user search query string;
- compare a character substring of the received user search query string against the in-string black list to determine if the character substring of the received user search query string matches at least one listing in the in-string black list;
- mark the received user search query string as potentially blocked if the character substring is determined to match the at least one listing in the in-string black list;
- match the character substring of the potentially blocked received user search query string against each entry of the in-string white list;
- determine that the character substring of the potentially blocked received user search query string does not exactly match a listing in the in-string white list; and
- as a result of determining that the character substring of the potentially blocked received user search query string does not exactly match a listing in the in-string white list, add the received user search query string to the in-string black list.

11. The system of claim 10, wherein the one or more processors are further operative with the instructions to:
unblock the received user search query string if the character substring exactly matches a listing in the in-string white list.

12. The system of claim 10, wherein the one or more processors are further operative with the instructions to:
block the received user search query string if the character substring does not exactly match a listing in the in-string white list.

13. The system of claim 10, wherein the one or more processors are further operative with the instructions to:
determine whether additional user search query strings are to be processed when the character substring does not exactly match a listing in the in-string white list.

14. The system of claim 10, wherein the one or more processors are further operative with the instructions to:
compare a substring of the received user search query string against an editorial list or automatically generated lists of adult URLs and search queries; and
mark the received user search query string as potentially blocked if the substring is determined to match the at least one listing in the editorial list or automatically generated lists of adult URLs and search queries.

15. The system of claim 10, wherein the one or more processors are further operative with the instructions to:
determine a threshold value of URLs clicked in response to the search query string; and
label the search query string within the in-string black list that points to a restricted content URL as a restricted content query if more than the threshold value of URLs are clicked in response to the search query string.

16. The system of claim 10, wherein the one or more processors are further operative with the instructions to:
override the in-string black list to allow a character substring included within the in-string black list to be included in the in-string white list.

17. The system of claim 10, wherein the one or more processors are further operative with the instructions to:
expand the in-string white list to maintain records for search queries and clicked URLs related to at least one of finance or banking.

18. A tangible, non-transitory computer-readable medium that stores instructions that, when executed by one or more processors, cause the one or more processors to perform operations comprising:
- retrieving an in-string black list and an in-string white list of search queries;
- receiving a user search query string;
- comparing a character substring of the received user search query string against the in-string black list to determine if the character substring of the received user search query string matches at least one listing in the in-string black list;
- marking the received user search query string as potentially blocked if the character substring is determined to match the at least one listing in the in-string black list;
- matching the character substring of the potentially blocked received user search query string against each entry of the in-string white list;
- determining that the character substring of the potentially blocked received user search query string does not exactly match a listing in the in-string white list; and
- as a result of determining that the character substring of the potentially blocked received user search query string does not exactly match a listing in the in-string white list, adding the received user search query string to the in-string black list.

* * * * *